United States Patent
Ohnstein et al.

(10) Patent No.: US 6,240,944 B1
(45) Date of Patent: Jun. 5, 2001

(54) ADDRESSABLE VALVE ARRAYS FOR PROPORTIONAL PRESSURE OR FLOW CONTROL

(75) Inventors: Thomas R. Ohnstein, Roseville; Eugen I. Cabuz, Edina, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/404,560

(22) Filed: Sep. 23, 1999

(51) Int. Cl.$^7$ .................................................. F16K 11/20
(52) U.S. Cl. ................... 137/1; 137/599.07; 251/129.01
(58) Field of Search ........................... 137/599.07, 487.5, 137/1; 251/129.01

(56) References Cited

U.S. PATENT DOCUMENTS

| | | |
|---|---|---|
| 3,726,296 * | 4/1973 | Friedland et al. ........................ 137/1 |
| 3,827,457 * | 8/1974 | Vutz et al. ............................ 137/599 |
| 5,082,242 | 1/1992 | Bonne et al. . |
| 5,176,358 | 1/1993 | Bonne et al. . |
| 5,180,623 | 1/1993 | Ohnstein . |
| 5,244,537 | 9/1993 | Ohnstein . |
| 5,323,999 | 6/1994 | Bonne et al. . |
| 5,368,704 | 11/1994 | Madou et al. . |
| 5,441,597 | 8/1995 | Bonne et al. . |
| 5,822,170 | 10/1998 | Cabuz et al. . |
| 5,897,097 | 4/1999 | Biegelsen et al. . |

OTHER PUBLICATIONS

Article "Development of a MEMS Microvalve array for Fluid Flow Control", Nelsimar Vandelli, Donald Wroblewski, Margo Velonis and Thomas Bifano, Journal of Microelectromechanical Systems, vol. 7, No. Dec. 4, 1998.

Article Micromachined Silicon Microvalve, T.Ohnstein, T.Fukiura, J.Ridley and U.Bonne, Sensor and System Development Center, Honeywell Inc., Bloomington, MN, Proceedings of MEMS, 1990, IEEE Microelectro Mechanical Systems, Napa Valley, CA, Feb. 11–14, 1990, pp. 95–98.

* cited by examiner

Primary Examiner—Stephen M. Hepperle
(74) Attorney, Agent, or Firm—John G. Shudy, Jr.

(57) ABSTRACT

A device for controlling the proportional pressure or flow of fluids over a range of source pressure. An addressable array is interposed between a source pressure and an exit pressure chamber. The array comprises a plurality of valves, the total open area of which define the opening between the source pressure and the exit pressure. Also provided is an actuator for separately actuating each valve of the array between an open and a closed condition, whereby the total number of open valves determines the flow between the source pressure and the exit pressure. The preferred valves are electrostatically actuated valves including upper and lower electrodes addressable by a conductor, and are fabricated monolithically on a single substrate. The array is formed so that actuation actuates a number of valves ranging from one valve to all the valves in the array. The device may be used to control flow between the source pressure and the exit pressure chamber. In another embodiment, the device further includes a proportional exit port in communication with the device for discharging a controlling pressure therefrom, the exit port being positioned to receive the proportion of fluid not discharged through the addressable array.

15 Claims, 3 Drawing Sheets

ADDRESSABLE VALVE ARRAYS FOR PROPORTIONAL PRESSURE OR FLOW CONTROL

FIELD OF THE INVENTION

The present invention relates to the control of proportional flow and pressure control of valves. More particularly the invention relates to the use of valve arrays and specifically microvalve arrays to permit partial closing or opening of the effective flow path in valves.

BACKGROUND OF THE INVENTION

In prior art devices, proportional flow or pressure control has been performed by partially closing or opening a valve to control the restriction of the valve, and thus the flow through the valve and the pressure drop across the valve. In the case of a microvalve, which is electrostatically actuated, it is not possible to perform proportional control in this manner due to the electrostatic pull-in effect when the critical field is reached in the valve structure.

In certain designs for microvalves and arrays, proportional control of flow and pressure has been attempted using a pulse-width modulation technique at a frequency ranging from approximately 20Hz to several hundred Hz, to control the amount of time the valve is open and closed. This pulse-width modulation technique requires constant operation of the valve arrays, resulting in a lifetime operating requirement for the number of actuations for the valves to be in the two to twenty billion range. Such a requirement for a proportional control valve is extremely difficult to achieve, if it is indeed possible with today's technology.

One example of a miniature gas valve is shown in commonly owned U.S. Pat. No. 5,082,242, divisional U.S. Pat. No. 5,180,623, and further divisional U.S. Pat. No. 5,244,537. These patents, incorporated by reference herein, describe an electronic microvalve in which the operative voltage is minimized. The microvalve is an integral structure made on a single piece of silicon and is a flow through valve with inlet and outlet on opposite sides of the silicon wafer.

Examples of microstructure gas valve control are shown in U.S. Pat. No. 5,176,358, divisional U.S. Pat. No. 5,323,999 and further divisional U.S. Pat. No. 5,441,597. These patents, also incorporated by reference herein, describe a flow control device in which there are separate main flow and flow control (servo) passages between an inlet port and an exit port. The valves are formed on a monolithic semi-conductor and are electrostatically controlled. U.S. Pat. No. 5,822,170, also incorporated by reference herein, describes in greater detail a touch mode electrostatic actuator which is useful in the above described valves, and which would be subject to a lifetime operating requirement for the number of actuations for the valves to be in the two to twenty billion range.

Accordingly, it would be of great advantage in the art if the usable lifetime of a valve array for a proportional flow or pressure control application would be greatly increased.

It would be another great advance in the art if more precise control of electrostatic arrays could be achieved, particularly in the manner in which separate valves in an array are actuated.

Other advantages will appear hereinafter.

SUMMARY OF THE INVENTION

It has now been discovered that the above and other objects of the present invention may be accomplished in the following manner. Specifically, the present invention provides for a design in which some, rather than all, of the valve array is actuated once for a flow or pressure control situation, instead of constant modulation of all of the valves.

The array is formed so that actuation actuates a number of valves ranging from one valve to all the valves in the array. The device and method of its use may be used to control flow between a source pressure and an exit pressure chamber. In another embodiment, the device also includes a proportional exit port in communication for discharging a controlling pressure therefrom, the exit port being positioned to receive the proportion of fluid not discharged through the addressable array.

The device of this invention includes an addressable array interposed between a source pressure and an exit pressure chamber, the array comprising a plurality of valves, the total open area of which define the opening between the source pressure and the exit pressure. It also includes an actuator for separately actuating each valve of the array between an open and a closed condition, whereby the total number of open valves determines the flow between the source pressure and the exit pressure.

The valves are preferably electrostatically actuated valves that are fabricated monolithically on a single substrate. The electrostatically actuated valves include upper and lower electrodes addressable by a conductor. Other actuation means are also contemplated.

In the preferred embodiment, one of the upper and lower electrodes is common to all the valves and the other of the upper and lower electrodes are connected in groups, whereby actuation of a specific group or groups actuates a number of valves ranging from one valve to all the valves in the array.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
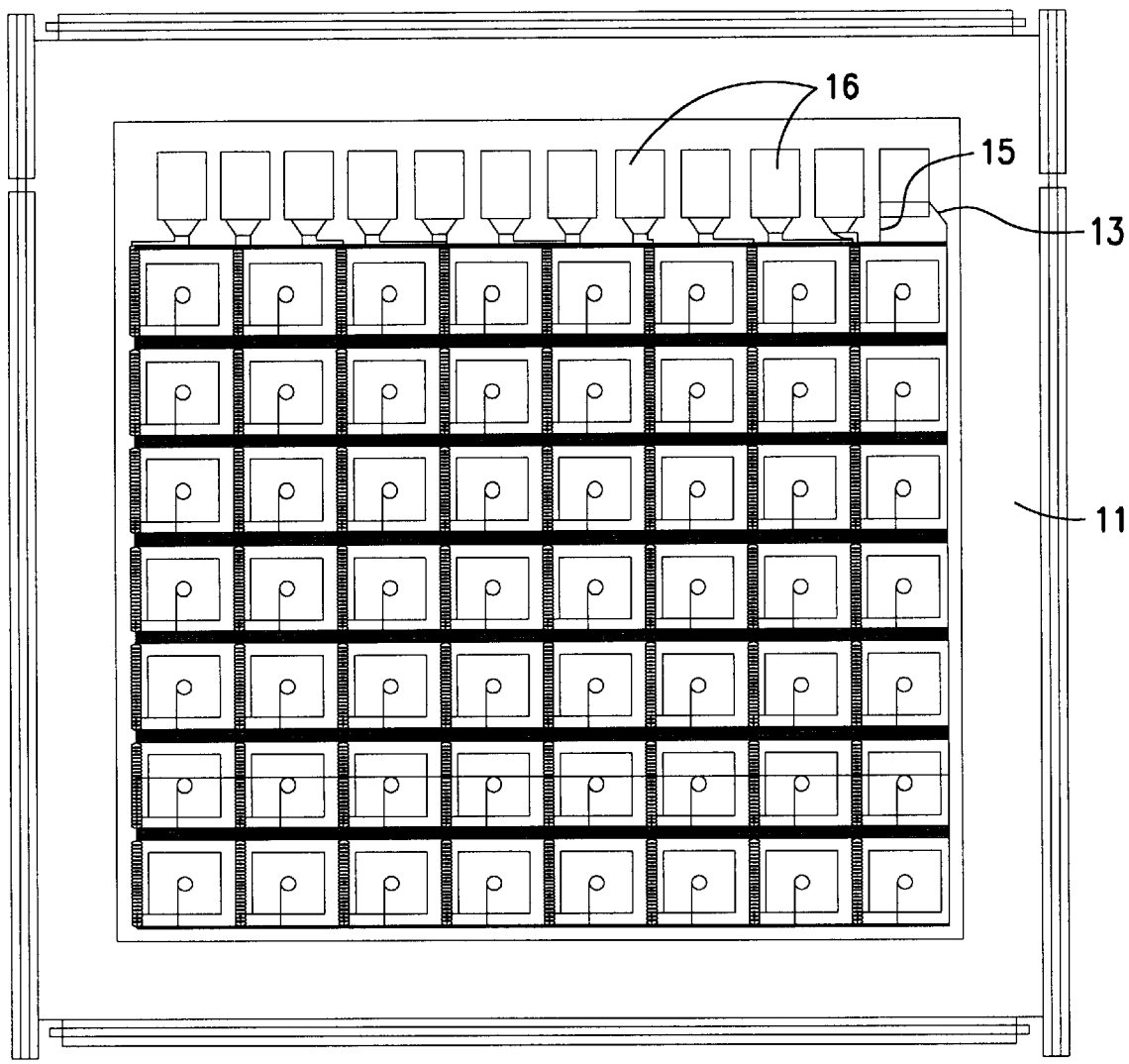
FIG. 1 is a schematic view of a 7×8 addressable array of valves, in which the valves are addressable in groups, such that any number of valves from 1 to 56 can be actuated.
Figure 5:
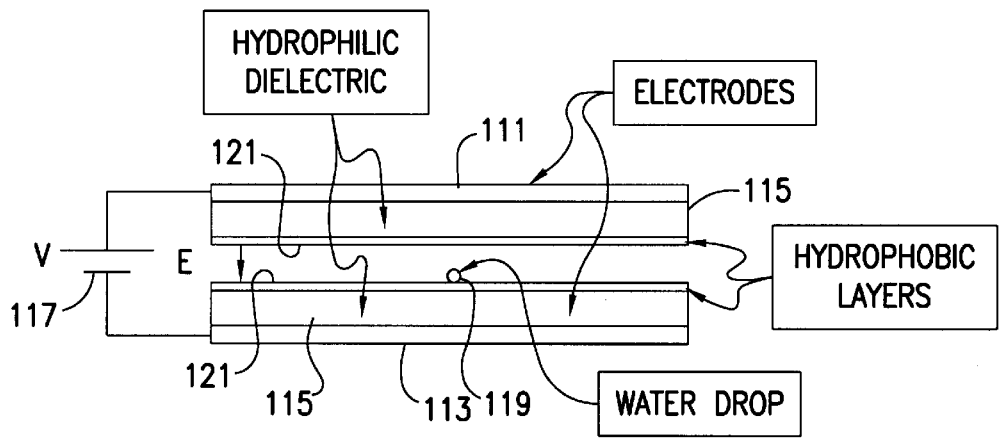
FIG. 5 is a schematic view of a touch mode electrostatic actuator, shown also in U.S. Pat. No. 5,822,170, which was incorporated by reference herein on page 3 hereof.

Turning now to the drawings, FIG. 1 illustrates a preferred approach to an addressable array is shown. The valves are fabricated monolithically on a single substrate, as is known. In FIG. 1, a seven by eight array 11 of valves is constructed, with one common bottom electrode connection 13 for the entire array. The connections 15 to the top electrodes of the valves are in groups. They are grouped as follows: 1,2,3,4, 5,6,7,7,7,7,7. Arrays with other grouping schemes have been made, such as 1,2,2,2,7,7,7,7,7,7,7. Other groupings which would allow even more flexibility in addressing the array would include a grouping such as 1,1,1,1,2,2,2,2,2,7,7,7,7, 7,7. A group or groups of valves is actuated by applying a potential to groups of valves; and by addressing combinations of these groups of valves, any number of valves from 1 to 56 can be actuated. FIG. 5 is a schematic view of a touch mode electrostatic actuator, shown also in U.S. Pat. No. 5,822,170, which was incorporated by reference herein on page 3 hereof.

A microprocessor, not shown, can be programmed to provide an output voltage to all the pads to open and close the desired number of valves. As can now be appreciated, the value of the present invention lies in the fact that the valves opened, or closed, are actuated once rather than over and over as would have been the case. Tests have shown actuator arrays to be operable without any failure or breakage when operated over 120 million cycles, which is much less than 20 billion or more as would be required in the past.

Flow control is performed with an addressable array of valves by having the valve directly in the fluid stream. As different numbers of valves are closed or opened, the effective orifice size of the valve array changes and the flow through the valve will be proportional to the supply pressure and the effective orifice size.

Figure 2:
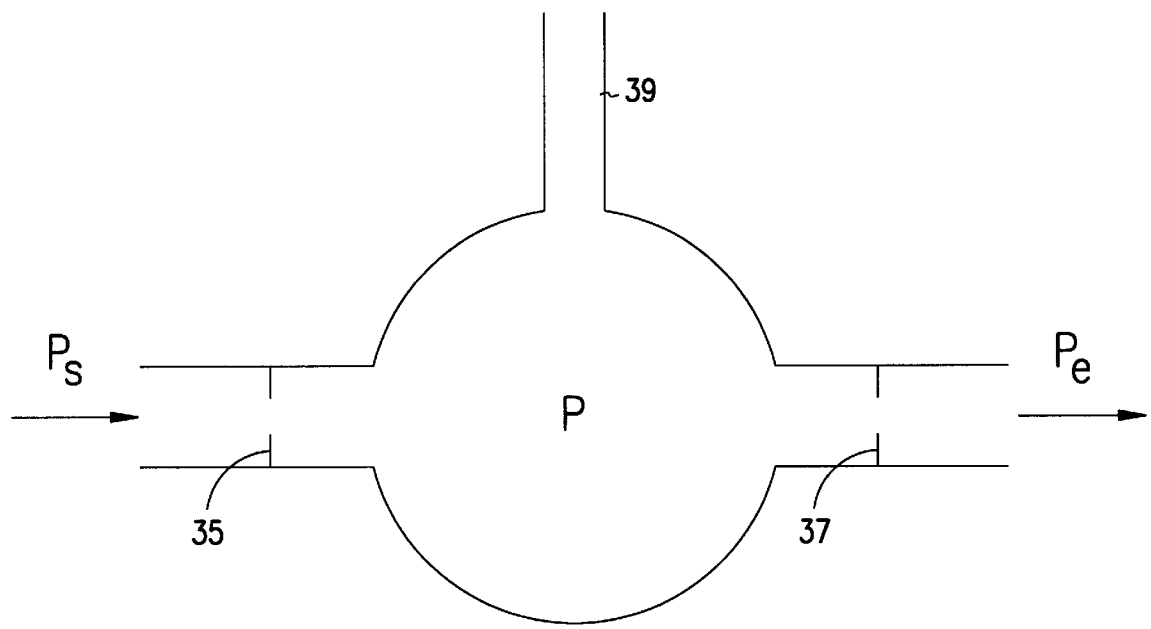
FIG. 2 is a schematic view of a configuration of a valve array and restricting orifice for pressure control of an intermediate pressure.

Pressure control with an addressable array of valves can be performed with the use of an additional fixed size restricting orifice. One way to implement a pressure control system is illustrated in FIG. 2. Ps is the supply pressure for the system, while P is the pressure to be controlled. P may be a controlling pressure which controls some actuator such as a pneumatic positioner. Pe is the exhaust pressure.

The restricting orifice 35 is a fixed size orifice and the valve array 37 is the addressable array of valves. The supply pressure Ps will be divided between Pe and P in a manner proportional to the ratio of the effective sizes of the two orifices 37 and 35, respectively. As the effective size of the valve array orifice 37 gets much smaller than the restrictor size, then P will approach the value of Ps. If the effective size of the array orifice 37 gets much larger than the restrictor, then P becomes smaller and approaches the pressure drop across just the restricting orifice 35. The pressure P can be controlled then by actuating the appropriate number of valves in the array, thus changing the effective orifice size.

Figure 3:
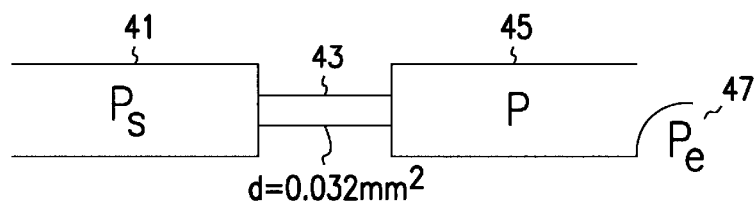
FIG. 3 is a schematic view of a proportional control system.

To demonstrate the efficacy of the present invention, experiments were performed, using a test device shown schematically in FIG. 3 and the addressable array of FIG. 1. In FIG. 3, pressure Ps was supplied from source 41 and passed through a restrictor 43 to provide a desired pressure P in chamber 45. The addressable array on chip 47, like that of FIG. 1, was controlled to open from 1 to 56 individual valves.

Figure 4:
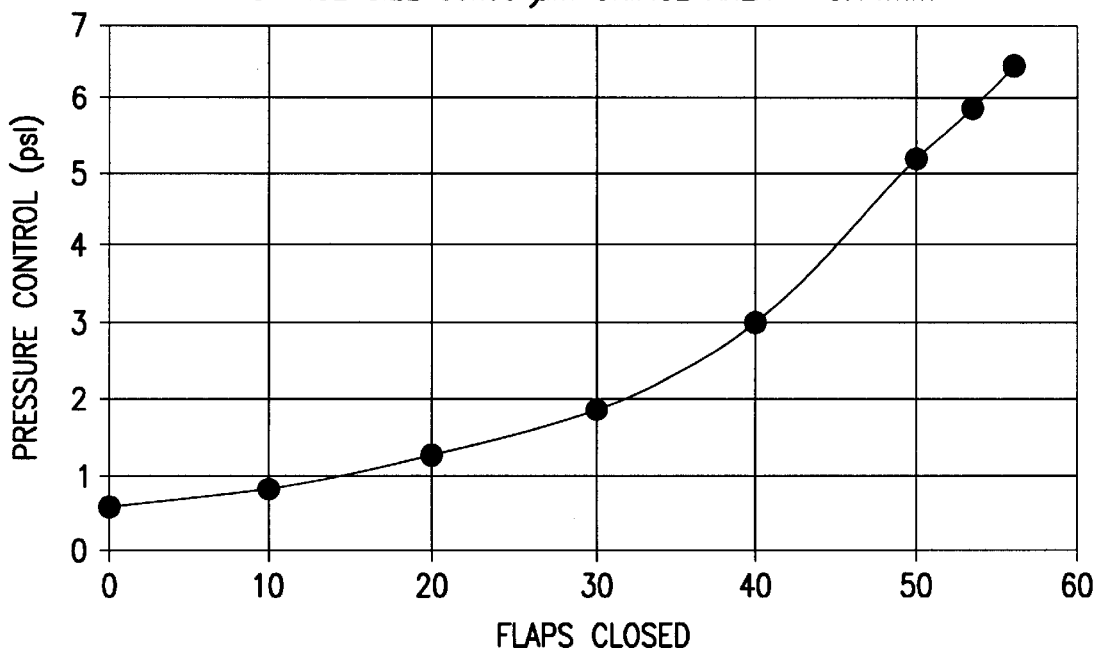
FIG. 4 is a graphical illustration of an experiment with the device of FIG. 3 and using the array of FIG. 1.

In an experiment, the orifice size in chip 47 was 50×50μm, the total orifice area was about 0.14 mm² and the voltage of the drive was 30 volts. The restrictor 43 diameter was about 0.032mm². Shown in FIG. 4 is a graph of the pressure controlled verses the number of closed flaps. As can be seen, the pressure from the source 41 was 6.5 psi, and the controlled pressure 45 ranged from about 0.6 psi to about 6.5 psi, with the increase having some degree of linearity. Of prime importance, however, is that the pressure could be controlled between the maximum and the minimum in up to 56 steps, the number of valves in the array, by selecting the needed number of valves to be closed.

While particular embodiments of the present invention have been illustrated and described, it is not intended to limit the invention, except as defined by the following claims.

FIG. 5 illustrates a touch mode electrostatic actuator having electrostatic plates 111 and 113, with 115 and a voltage source 117.

What is claimed is:

1. A device for controlling the proportional pressure or flow of fluids over a range of source pressure, comprising:

an addressable array interposed between a source pressure and an exit pressure chamber, said array comprising a plurality of electrostatically actuated valves, the total open area of which define the opening between said source pressure and said exit pressure, said electrostatically actuated valves including upper and lower electrodes addressable by a conductor, wherein one of said upper and lower electrodes being common to all said valves and the other of said upper and lower electrodes are connected in groups whereby actuation of a specific group or groups actuates a number of valves ranging from one valve to all the valves in said array; and an actuator for separately actuating each valve of said array between an open and a closed condition, whereby the total number of open valves determines the flow between said source pressure and said exit pressure.

2. The device of claim 1, wherein said valves are fabricated monolithically on a single substrate.

3. The device of claim 1, wherein said device is used to control flow between said source pressure and said exit pressure chamber.

4. The device of claim 1, which further includes a proportional exit port in communication with said device for discharging a controlling pressure therefrom, said proportional exit port being positioned to receive the proportion of fluid not discharged through said addressable array.

5. A device for controlling the proportional pressure or flow of fluids over a range of source pressure, comprising:

addressable array means interposed between a pressure source means and an exit pressure means, said array means comprising a plurality of valve means, the total open area of which define the opening between said pressure source means and said exit pressure means; and an addressable array means interposed between a pressure source means and an exit pressure means, said array means comprising a plurality of electrostatically actuated valve means, the total open area of which define the opening between said source means and said exit pressure means, said electrostatically actuated valve means including upper and lower electrodes addressable by conductor means, wherein one of said upper and lower electrodes being common to all said valve means and the other of said upper and lower electrodes are connected in groups whereby actuation of a specific group or groups actuates a number of valve means ranging from one valve means to all the valve means in said array; and actuator means for separately actuating each valve of said array between an open and a closed condition, whereby the total number of open valves determines the flow between said source pressure and said exit pressure.

6. The device of claim 8, wherein said valve means is fabricated monolithically on a single substrate.

7. The device of claim 5, wherein said device is used to control flow between said pressure source means and said exit pressure means.

8. The device of claim 5, which further includes proportional exit port means in communication with said device for discharging a controlling pressure therefrom, said proportional exit port means being positioned to receive the proportion of fluid not discharged through said addressable array means.

9. A method of controlling the proportional pressure or flow of fluids over a range of source pressure, comprising the steps of:

positioning an addressable array interposed between a source pressure and an exit pressure chamber, said array comprising a plurality of electrostatically actuated valves, the total open area of which define the opening between said source pressure and said exit pressure, said electrostatically actuated valves including upper and lower electrodes addressable by a conductor, wherein one of said upper and lower electrodes being common to all said valves and the other of said upper and lower electrodes are connected in groups, whereby actuation of specific group or groups actuates a number of valves ranging from one valve to all valves in said array; and controlling an actuator for separately actuating each valve of said array between an open and a closed condition, whereby the total number of open valves determines the flow between said source pressure and said exit pressure.

10. The method of claim 9, which includes the step of fabricating said valves monolithically on a single substrate.

11. The method of claim 9, wherein said method is used to control flow between said source pressure and said exit pressure chamber.

12. The method of claim 9, which further includes the step of providing a proportional exit port in communication therewith for discharging a controlling pressure therefrom, said proportional exit port being positioned to receive the proportion of fluid not discharged through said addressable array.

13. A device for controlling the proportional pressure or flow of fluids over a range of source pressure, comprising:

an addressable array interposed between a source pressure and an exit pressure chamber, said array comprising a plurality of valves, the total open area of which define the opening between said source pressure and said exit pressure;

an actuator for separately actuating each valve of said array between an open and a closed condition, whereby the total number of open valves determines the flow between said source pressure and said exit pressure; and a proportional exit port in communication with said device for discharging a controlling pressure therefrom, said proportional exit port being positioned to receive the proportion of fluid not discharged through said addressable array.

14. A device for controlling the proportional pressure or flow of fluids over a range of source pressure, comprising:

addressable array means interposed between a pressure source means and an exit pressure means, said array means comprising a plurality of valve means, the total open area of which define the opening between said pressure source means and said exit pressure means; and actuator means for separately actuating each valve of said array between an open and a closed condition, whereby the total number of open valves determines the flow between said source pressure and said exit pressure.

15. A method of controlling the proportional pressure or flow of fluids over a range of source pressure, comprising the steps of:

positioning an addressable array interposed between a source pressure and an exit pressure chamber, said array comprising a plurality of valves, the total open area of which define the opening between said source pressure and said exit pressure; and controlling an actuator for separately actuating each valve of said array between an open and a closed condition, whereby the total number of open valves determines the flow between said source pressure and said exit pressure; and providing a proportional exit port in communication therewith for discharging a controlling pressure therefrom, said proportional exit port being positioned to receive the proportion of fluid not discharged through said addressable array.

* * * * *